United States Patent Office 3,813,393
Patented May 28, 1974

3,813,393
PYRIMIDOTRIAZINES
Kenneth John Maynard Andrews, and Brian Peter Tong, Harpenden, England, assignors to Hoffmann-La Roche Inc., Nutley, N.J.
No Drawing. Filed June 23, 1972, Ser. No. 265,879
Int. Cl. C07d 57/34
U.S. Cl. 260—249.5  41 Claims

ABSTRACT OF THE DISCLOSURE

A new class of pyrimidotriazines is described having a general anti-inflammatory activity and specific compounds therein also exhibit a diuretic activity. Methods for the preparation of the instant pyrimidotriazines are also described.

The new pyrimidotriazines are of the following formula

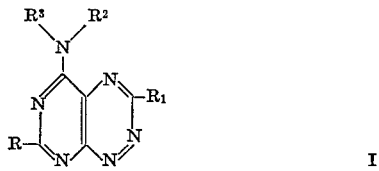

wherein R is a trifluoromethyl, lower alkyl, aryl or lower aralkyl group, $R^1$ is a hydrogen atom or a lower alkyl, aryl or lower aralkyl group, $R^2$ is a hydrogen atom and $R^3$ is a hydrogen atom or a lower alkyl, lower alkenyl, lower alkynyl, lower cycloalkyl, aryl, lower aralkyl, hydroxyl, hydroxy-(lower alkyl) or acyl group or $R^2$ and $R^3$ each represent a lower alkyl group which may be joined directly or through an oxygen, nitrogen or sulfur atom to form with the nitrogen atom to which they are attached to a 5-membered or 6-membered heteromonocyclic ring.

BRIEF DESCRIPTION OF THE INVENTION

The present invention is concrened with pyrimidotriazines and a method for the preparation thereof.

The pyrimidotriazines of the present invention have the following general formula

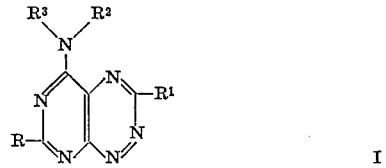

wherein R is a trifluoromethyl, lower alkyl, aryl or lower aralkyl group, $R^1$ is a hydrogen atom or a lower alkyl, aryl or lower aralkyl group, $R^2$ is a hydrogen atom and $R^3$ is a hydrogen atom or a lower alkyl, lower alkenyl, lower alkynyl, lower cycloalkyl, aryl, lower arakyl, hydroxy, hydroxy-(lower alkyl) or acyl group or $R^2$ and $R^3$ each represent a lower alkyl group which may be joined directly or through an oxygen, nitrogen or sulfur atom to form with the nitrogen atom to which they are attached a 5-membered or 6-membered heteromonocyclic ring.

The pyrimidotriazines of the present invention possess interesting pharmacological activity. In particular they exhibit anti-inflammatory activity while certain of them also possess a diuretic activity.

The term "lower alkyl" is used in this specification to mean both straight-chain and branched-chain saturated hydrocarbon radicals, i.e., alkyl groups which preferably contain from 1 to 6 carbon atoms such as methyl, ethyl, propyl, isopropyl, butyl, isobutyl, tertbutyl, pentyl and hexyl. The term "lower alkenyl" is used to mean both straight-chain and branched-chain saturated hydrocarbon radicals containing at least one acetylenic triple bond, i.e., alkynyl groups containing from 2 to 6 carbon atoms such as propynyl and butynyl.

The term "lower cycloalkyl" preferably means cycloalkyl groups containing from 3 to 6 carbon atoms such as cyclopropyl, cyclobutyl and cyclohexyl. The term "aryl" means phenyl and phenyl which carries one or more halo (i.e., fluoro, chloro, bromo or iodo), lower alkyl and/or lower alkoxy substituents. Examples of such substituted-aryl groups are p-chloro-phenyl, 3,4-dichloro-phenyl, orthotolyl, paratolyl and p-methoxy-phenyl.

The term "lower aralkyl" means an aryl-(lower alkyl) group in which the "aryl" and "lower alkyl" moieties are as defined earlier; for example, benzyl, p-chloro-benzyl and β-phenethyl. The hydroxy-(lower alkyl) group may be, for example, a 2-hydroxy-ethyl or 3-hydroxy-propyl group. The term "acyl" is used to mean an acyl group derived from a lower alkane carboxylic acid (preferably one containing up to 6 carbon atoms such as acetic acid, propionic acid, butyric acid and the like) or from an aromatic carboxylic acid such as benzoic acid or a benzoic acid subsituted with halo such as p-chloro-benzoic acid. Examples of 5-membered and 6-membered heteromonocyclic rings are the pyrrolidino, piperidino, piperazino, morpholino and thiamorpholino rings.

One preferred embodiment of pyrimidotriazines of formula I comprises those in which R is a lower alkyl group, $R^1$ is a hydrogen atom or a lower alkyl group, $R^2$ is a hydrogen atom and $R^3$ is a hydrogen atom or a lower alkyl group. Another preferred embodiment of pyrimidotriazines of formula I comprises those in which R is a lower alkyl group, $R^1$ is a hydrogen atom or a lower alkyl group and $R^2$ and $R^3$ each are a lower alkyl group. Particularly interesting pyrimidotriazines of formula I are those in which R is a methyl or ethyl group, $R^1$ is a hydrogen atom, $R^2$ is a hydrogen atom and $R^3$ is a methyl group or $R^2$ and $R^3$ each represent a methyl group.

Examples of pyrimidotriazines of formula I are:
5-amino-7-methyl-pyrimido[5,4-e]-*as*-triazine,
5-amino-3,7-dimethyl-pyrimido[5,4-e]-*as*-triazine,
5-amino-7-ethyl-pyrimido[5,4-e]-*as*-triazine,
5-amino-7-*n*-hexyl-pyrimido[5,4-e]-*as*-triazine,
7-methyl-5-methylamino-pyrimido[5,4-e]-*as*-triazine,
5-dimethylamino-7-methyl-pyrimido[5,4-e]-*as*-triazine,
5-ethylamino-7-methyl-pyrimido[5,4-e]-*as*-triazine,
5-*iso*propylamino-7-methyl-pyrimido[5,4-e]-*as*-triazine,
5-*n*-butylamino-7-methyl-pyrimido[5,4-e]-*as*-triazine,
5-diethylamino-7-methyl-pyrimido[5,4-e]-*as*-triazine,
7-methyl-5-morpholino-pyrimido[5,4-e]-*as*-triazine,
5-dimethylamino-7-*neo*pentyl-pyrimido[5,4-e]-*as*-triazine,
5-methylamino-7-*neo*pentyl-pyrimido[5,4-e]-*as*-triazine,
5-dimethylamino-7-methyl-3-phenyl-pyrimido[5,4-e]-*as*-triazine,
7-methyl-5-methylamino-3-phenyl-pyrimido[5,4-e]-*as*-triazine,
5-amino-7-methyl-3-phenyl-pyrimido[5,4-e]-*as*-triazine,
5-amino-7-ethyl-3-phenyl-pyrimido[5,4-e]-*as*-triazine,
5-dimethylamino-7-phenyl-pyrimido[5,4-e]-*as*-triazine,
5-methylamino-7-phenyl-pyrimido[5,4-e]-*as*-triazine,
5-amino-7-phenyl-pyrimido[5,4-e]-*as*-triazine,
5-amino-3-methyl-7-phenyl-pyrimido[5,4-e]-*as*-triazine,
5-dimethylamino-7-trifluoromethyl-pyrimido[5,4-e]-*as*-triazine,
5-methylamino-7-trifluoromethyl-pyrimido[5,4-e]-*as*-triazine,
7-benzyl-5-dimethylamino-pyrimido[5,4-e]-*as*-triazine,
5-amino-7-trifluoromethyl-pyrimido[5,4-e]-*as*-triazine,
5-allylamino-7-methyl-pyrimido[5,4-e]-*as*-triazine,
7-methyl-5-propargylamino-pyrimido[5,4-e]-*as*-triazine,
5-cyclopropylamino-7-methyl-pyrimido[5,4-e]-*as*-triazine,
7-methyl-5-morpholino-pyrimido[5,4-e]-*as*-triazine, 5-hydroxyamino-7-methyl-pyrimido[5,4-e]-*as*-triazine,
7-ethyl-5-(2-hydroxy-ethylamino)-pyrimido[5,4-e]-*as*-triazine,
5-acetamido-7-methyl-pyrimido[5,4-e]-*as*-triazine,
7-methyl-5-propionamido-pyrimido[5,4-e]-*as*-triazine,
5-isobutyramido-7-methyl-pyrimido[5,4-e]-*as*-triazine and
7-methyl-5-(*p*-chloro-benzamido)-pyrimido[5,4-e]-*as*-triazine.

The pyrimidotriazines of formula I may be readily prepared by alternative procedures.

In one process embodiment of this invention a hydrazinopyrimidine of the general formula

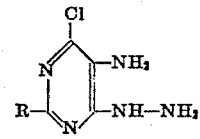

wherein R is as above is reacted with a compound of the general formula $$R^1\text{---}C(OR^4)_3 \qquad \text{III}$$

wherein $R^1$ is as above and $R^4$ is a lower alkyl group in the presence of a strong acid to give an acid addition salt of a compound of the general formula

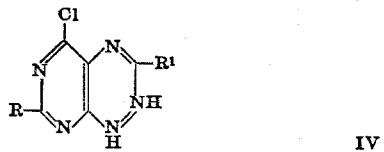

wherein R and $R^1$ are as above, and treating said acid addition salt or the free base obtained therefrom with ammonia or with an alkali metal azide or with ammonia in the presence of an alkali metal azide to give a pyrimidotriazine of formula I in which $R^2$ and $R^3$ each is a hydrogen atom.

In a further process embodiment of the invention an acid addition salt of a compound of formula IV or the free base obtained therefrom is reacted with an amine of the general formula

wherein $R^{20}$ is a hydrogen atom and $R^{30}$ is a lower alkyl, lower alkenyl, lower alkynyl, lower cycloalkyl, aryl, lower aralkyl or hydroxy-(lower alkyl) group or $R^{20}$ and $R^{30}$ each is a lower alkyl group which may be joined directly or through an oxygen, nitrogen or sulfur atom to form with the nitrogen atom to which they are attached a 5-membered or 6-membered heteromonocyclic ring.

under oxidizing conditions to give a pyrimidotriazine of formula I in which $R^2$ and $R^3$ have any of the values accorded to $R^{20}$ and $R^{30}$ hereinbefore.

Additionally, compounds of formula I prepared above can be converted to other embodiments of formula I. For example, a pyrimdotriazine of formula I in which $R^2$ and $R^3$ each is a methyl group is treated wtih hydroxylamine to give a pyrimidotriazine of formula I in which $R^2$ is a hydrogen atom and $R^3$ is a hydroxy group. Furthermore, a pyrimidotriazine of formula I in which $R^2$ and $R^3$ each is a hydrogen atom may be acylated to give a pyrimidotriazine of formula I in which $R^2$ is a hydrogen atom and $R^3$ is an acyl group. A pyrimidotriazine of formula I in which $R^2$ and $R^3$ each is a methyl group may be converted into a pyrimidotriazine of formula I in which $R^2$ is a hydrogen atom and $R^3$ is a lower alkyl, lower alkenyl, lower alkynyl, lower cycloalkyl, aryl, lower aralkyl or hydroxy-(lower alkyl) group by heating with an amine of the general formula $$H_2N\text{---}R^{31} \qquad \text{VI}$$

wherein $R^{31}$ represents a lower alkyl, lower alkenyl, lower alkynyl, lower cycloalkyl, aryl, lower aralkyl or hydroxy-(lower alkyl) group.

Alternatively, a pyrimidotriazine of formula I in which $R^2$ and $R^3$ each is a methyl group may be converted into a pyrimidotriazine of formula I in which $R^2$ and $R^3$ each is a hydrogen atom by heating with ammonia.

Finally, treating a pyrimidotriazine of formula I in which $R^2$ and $R^3$ each is a hydrogen atom with an amine of formula VI hereinbefore provides a pyrimidotriazine of formula I in which $R^2$ is a hydrogen atom and $R^3$ is a lower alkyl, lower alkenyl, lower alkynyl, lower cycloalkyl, aryl, lower aralkyl or hydroxy-(lower alkyl) group.

The hydrazinopyrimidine starting materials of formula II can be prepared, for example, by reacting a substituted-pyrimidine of the general formula

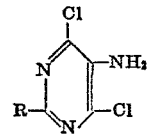

wherein R is as above with hydrazine hydrate.

The reaction of a hydrazinopyrimidine of formula II with a compound of formula III is carried out in the presence of a strong acid. Any strong acid may be used, but it is preferred to use a strong inorganic acid such as a hydrohalide acid (e.g., hydrochloric acid) or sulfuric acid. The reaction is conveniently carried out in an inert organic solvent such as a lower alkanol (e.g., methanol or ethanol) or an N,N-di(lower alkyl)-(lower alkanoyl) amide (e.g., N,N-dimethylformamide). Other organic solvents may be used provided that they are inert under the conditions of the reaction. The reaction, which proceeds exothermically, is suitably carried out at a temperature of from about 20° C. to 30° C., preferably at room temperature.

A resulting acid addition salt of a compound of formula IV, or preferably, a free base obtained therefrom is then treated with ammonia or an alkali metal azide or ammonia in the presence of an alkali metal azide to give a pyrimidotriazine of formula I in which $R^2$ and $R^3$ each is a hydrogen atom. A free base of formula IV can be obtained from an acid addition salt of a compound of formula IV by, for example, treatment with a base such as an alkali metal bicarbonate (e.g., sodium bicarbonate) or, when R and/or $R^1$ are an aryl group, by stirring a mixture of the acid addition salt in water. Of the alkali metal azides which may be used, sodium azide is preferred. This treatment is expediently carried out in an inert organic solvent such as a lower alkanol (e.g., methanol or ethanol), a mixture of a lower alkanol and water or an N,N-di(lower alkyl)-(lower alkanoyl) amide (e.g., N,N-dimethylformamide). Other organic solvents which are inert under the conditions of the treatment may also be employed. The treatment is suitably carried out at an elevated temperature, preferably at the reflux temperature of the mixture.

An acid addition salt of a compound of formula IV or a free base obtained therefrom (e.g. in the manner described earlier) is reacted with an amine of formula V under oxidizing conditions to give a pyrimidotriazine of formula I in which $R^2$ and $R^3$ have any of the values accorded to $R^{20}$ and $R^{30}$ hereinbefore. Examples of amines of formula V which can be used are lower alkyl amines (e.g. methyl amine, ethyl amine etc.), lower alkenyl amines (e.g. allyl amine etc.), lower alkynyl amines (e.g. propargyl amine etc.), lower cycloalkyl amines (e.g. cyclopropylamine etc.), aryl amines (e.g. aniline, *p*-chloro-aniline etc.), lower aralkyl amines (e.g. benzyl amine, p-chloro-benzyl amine etc.), hydroxy-(lower alkyl) amines (e.g. ethanolamine etc.), di(lower alkyl) amines (e.g. dimethyl amine, diethyl amine etc.) and appropriate heterocyclic amines (e.g. morpholine, pyrrolidine, piperazine, piperidine, thiamorpholine etc.). When an acid addition salt of a compound of formula IV is used, it is preferred to employ at least 3 moles (especially 3–4 moles) of an amine of formula V per mol of said addition salt. This reaction is expediently carried out in an inert polar organic solvent such as a lower alkanol (e.g. methanol or ethanol), acetonitrile or dimethyl sulphoxide. The oxidizing conditions may be provided by passing oxygen or air through a mixture of the reactants in a solvent of the kind mentioned earlier or even by stirring the mixture in air. The reaction is suitably carried out at a temperature between about 15° C. and 25° C., preferably at room temperature.

Pyrimidotriazines of formula I in which $R^2$ is a hydrogen atom and $R^3$ is a hydroxy group are prepared by treating a pyrimidotriazine corresponding to formula I in which $R^2$ and $R^3$ each is a methyl group with hydroxylamine. This treatment is suitably carried out in an inert organic solvent (e.g., a lower alkanol such as methanol or ethanol) and at an elevated temperature, preferably at a temperature at or near the reflux temperature of the mixture.

The acylation of a pyrimidotriazine corresponding to formula I in which $R^2$ and $R^3$ each is a hydrogen atom to give a pyrimidotriazine of formula I in which $R^2$ is a hydrogen atom and $R^3$ is an acyl group is carried out according to methods known per se. The acylation is, however, preferably carried out using an appropriate acid anhydride (e.g., acetic anhydride, propionic anhydride, isobutyric anhydride, etc.) at an elevated temperature (e.g., a temperature up to the reflux temperature of the mixture). This acylation procedure can be carried out, if desired, in the presence of an inert organic solvent (e.g., a halogenated hydrocarbon such as chloroform) and a tertiary organic base (e.g., triethylamine or pyridine). Alternatively, the acylation can be carried out using an appropriate acid halide, preferably an acid chloride such as (for example, acetyl chloride, propionyl chloride, benzoyl chloride, p-chlorobenzoyl chloride, etc.). This acylation procedure is suitably carried out at about room temperature in the presence of a tertiary organic base (e.g., triethylamine or, preferably, pyridine).

In accordance with a further embodiment of the present process, a pyrimidotriazine corresponding to formula I in which $R^2$ and $R^3$ each is a methyl group is heated with an amine of formula VI to yield a pyrimidotriazine of formula I in which $R^2$ is a hydrogen atom and $R^3$ is a lower alkyl, lower alkenyl, lower alkynyl, lower cycloalkyl, aryl, lower aralkyl or hydroxy-(lower alkyl) group. Examples of amines of formula VI which may be used are lower alkylamines (e.g., methylamine, ethylamine, propylamine, isopropylamine, etc.), lower alkenylamines (e.g., allylamine etc), lower alkynylamines (e.g., propargylamine, etc.), lower cycloalkylamines (e.g., cyclopropylamine, cyclobutylamine, etc.), arylamines (e.g., aniline, p-chloroaniline, etc.), lower aralkylamines (e.g., benzylamine, p-chlorobenzylamine, etc.) and lower alkanolamines (e.g., ethanolamine etc.). It is preferred to use at least a part of the amine of formula VI in the form of an acid addition salt, particularly the hydrochloride. It is also convenient to use a large molar excess of the amine of formula VI or acid addition salt thereof. This heating can be carried out in an inert organic solvent, preferably a lower alkanol (e.g., methanol or ethanol). Other inert organic solvents which may be used include cellosolve and diglyme. It is convenient to carry out this heating at a temperature at or near the reflux temperature of the mixture. The heating may also be carried out under pressure if desired.

A pyrimidotriazine of formula I in which $R^2$ and $R^3$ each is a methyl group is heated with ammonia to yield a pyrimidotriazine of formula I in which $R^2$ and $R^3$ each is a hydrogen atom. This heating can be carried out by passing ammonia gas for a long period of time through a solution of the pyrimidotriazine in an inert organic solvent (e.g., a lower alkanol such as methanol or ethanol, cellosolve or diglyme) maintained at a temperature at or near the reflux temperature of the mixture. However, in a preferred procedure, the heating is carried out by treating the pyrimidotriazine with a solution of ammonia in a suitable solvent (e.g., 3-N ethanolic ammonia) and heating the mixture in a closed vessel at a temperature of from about 90° C. to 110° C. for about 12 to 16 hours. It is preferred to use a large excess of ammonia in this embodiment.

According to the final embodiment of the present process, a pyrimidotriazine corresponding to formula I in which $R^2$ and $R^3$ each is a hydrogen atom is treated with an amine of formula VI to yield a pyrimidotriazine of formula I in which $R^2$ is a hydrogen atom and $R^3$ is a lower alkyl, lower alkenyl, lower alkynyl, lower cycloalkyl, aryl, lower aralkyl or hydroxy-(lower alkyl) group. It is convenient to use at least a part of the amine of formula VI in the form of an acid addition salt thereof, particular the hydrochloride. It is also convenient to use a molar excess (e.g., a 4–5 molar excess) of the amine or acid addition salt thereof. This treatment may suitably be carried out in an inert organic solvent, preferably a lower alkanol (e.g., methanol or ethanol) which may be aqueous in nature. Other organic solvents which are inert under the conditions employed may also be used. It is expedient to carry out this treatment at an elevated temperature, suitably at or near the the reflux temperature of the mixture.

The anti-inflammatory activity of the pyrimidotriazines of the present invention can be demonstrated in standard tests for such activity. One such test comprises administering the pyrimidotriazine to be tested to groups of six male albino rats on each of five consecutive days. Three hours after the first administration, 0.05 ml. of a 0.5% suspension of *Mycobacterium butyricum* in sterilized olive oil is injected into the right hind foot of each rat. The volume of the paw of each rat is measured immediately after administration of the pyrimidotriazine and again 96 hours later; the difference being recorded as a volume of oedema. From these measurements there is calculated the dosage required to produce a 30 percent reduction in oedema which is designated as $ED_{30}$. In this test, 5-amino-7-ethyl-pyrimido[5,4-e]-*as*-triazine has an $ED_{30}$ of 1.95 mg./kg. *per os* and 5-amino-7-methyl-pyrimido[5,4-e]-*as*-triazine has an $ED_{30}$ of 9.0 mg./kg. *per os*. Phenylbutazone, a well-known anti-inflammatory agent, has an $ED_{30}$ of 5.1 in the same test.

The pyrimidotriazines provided by the present invention may accordingly be used as medicaments; for example, in the form of pharmaceutical preparations which contain them in association with a compatible pharmaceutical carrier. Examples of suitable carriers, which may be organic or inorganic in nature, are water, gelatin, lactose, starch, magnesium stearate, talc, vegetable oils, gums, polyalkylene glycols or petroleum jelly. The pharmaceutical preparations may be made up in a dosage form suitable for enteral (e.g. oral) or parenteral administration; for example in a solid form (e.g. as capsules, tablets, dragées or suppositories) or in a liquid form (e.g. as solutions, emulsions or suuspensions). The pharmaceutical preparations may be submitted to the customary pharmaceutical techniques such as sterilization and may contain conventional pharmaceutical adjuvants such as preserving agents, stabilizing agents, wetting agents, salts for altering the osmotic pressure or buffers.

A total oral daily dosage regimen using compounds of formula I comprises from 150 mg. to 250 mg. given preferably in divided doses for anti-inflammatory activity and from 100 mg. to 200 mg. given preferably in divided doses for diuretic activity.

The diuretic activity of pyrimidotriazines of the present invention can be demonstrated in standard tests for such activity. In one such test, six adrenalectomized male rats (200–225 g.) which have received normal saline and stock diet are used. 22 hours prior to the test, the normal saline is replaced by tap water and ca 2–5 hours prior to the test, all food and water are removed. 5 ml. of normal saline are administered intraperitoneally to each rat, followed immediately by both an intraperitoneal (saline solution) and subcutaneous (olive oil) injection of the test compound as either 0.1 mg. (total dose=0.2 mg.) or 1.0 mg. (total dose=2.0 mg.) per rat. A 5 hour pooled urine sample is then collected from each pair of rats and is measured with respect to volume and $Na^+, K^+$ and $Cl^-$ content. Mean values for each pair of rats as well as $Na^+/K^+$ ratios are calculated and compared with a placebo and a standard diuretic. In this test, 7-ethyl-5-(2-hydroxyethylamino)-pyrimido[5,4-e]-as-triazine is active at 3.0 mg./rat. Hydrochlorothiazide, a well-known diuretic, is active at 2.0 mg./rat in the same test.

EXAMPLE 1

(A) The preparation of the starting material 127 g. of 5-amino-4,6-dichloro-2-methyl-pyrimidine were added with stirring to 465 ml. of hydrazine hydrate. The internal temperature was allowed to rise spontaneously to 30° C., then the reaction vessel was cooled in ca 30° C. When the exothermic phase of the reaction was almost complete, the internal temperature was allowed to rise to 35° C. The 5-amino-4,6-dichloro-2-methyl-pyrimidine dissolved completely after ca 20 minutes and 5 - amino-4-chloro-6-hydrazino-2-methyl-pyrimidine was deposited from the resulting solution after seeding. The resulting mixture was stirred at room temperature for 2 hours; the solid was subsequently filtered off, washed with two 100 ml. portions of cold isopropanol and two 150 ml. portions of ether and dried to yield 93.5 g. of 5 - amino-4-chloro-6-hydrazino-2-methyl-pyrimidine of melting point 161°–163° C. (with decomposition).

(B) The process 72 ml. of 5-$\underline{N}$ ethanolic hydrogen chloride were added dropwise to a stirred mixture of 50 g. of 5-amino-4-chloro-6-hydrazino-2-methyl-pyrimidine and 64 g. of triethyl orthoformate in 250 ml. of dry ethanol, the reaction temperature being maintained below 30° C. by ice-cooling. The resulting pale orange suspension was stirred at room temperature for 2 hours, then the solid was filtered off and washed successively with acetone and ether to yield 62.1 g. of 5-chloro-1,2-dihydro-7-methyl-pyrimido[5,4-e]-as-triazine hydrochloride.

23.75 g. of sodium bicarbonate were added to a stirred solution of 62.1 g. of 5-chloro-1,2-dihydro-7-methyl-pyrimido[5,4-e]-as-triazine hydrochloride in 1780 ml. of 50% aqueous ethanol. When the effervescence had ceased, the resulting suspension of the 5-chloro-1,2-dihydro-7-methyl-pyrimido[5,4-e]-as-triazine free base was treated with 29.4 g. of sodium azide, boiled under reflux for 2 hours, cooled in ice and filtered to yield 31.8 g. of 5-amino-7-methyl-pyrimido[5,4-e]-as-triazine having a melting point above 240° C. (with decomposition) after recrystallization from water. The thin-layer chromatogram (silica gel, 10% methanol/chloroform) showed a single spot; $\lambda_{max}$ (0.1-$\underline{N}$ hydrochloric acid) 218 nm. ($\epsilon$=10,700), 245 nm. ($\epsilon$=8,000), 346 nm. ($\epsilon$=8,300); nuclear magnetic resonance (trifluoracetic acid): $-0.3\tau$ (1H, singlet), $7.0\tau$ (3H, singlet).

EXAMPLE 2

In a manner analogous to that described in Example 1B, from 5-amino-4-chloro-6-hydrazino-2-methyl-pyrimidine and triethyl orthoacetate there was obtained 5-amino-3,7-dimethyl-pyrimido[5,4-e]-as-triazine; melting point 245°–246° C. (with decomposition); $\lambda_{max}$ (0.1-$\underline{N}$ hydrochloric acid) 215 nm. ($\epsilon$=10,500), 246 nm. ($\epsilon$=8,900), 350 nm. ($\epsilon$=8,200); nuclear magnetic resonance [$(CD_3)_2SO$]: $1.53\tau$ (2H, broad), $7.00\tau$ (3H, singlet), $7.47\tau$ (3H, singlet).

EXAMPLE 3

(A) The preparation of the starting material

In a manner analogous to that described in Example 1A, from 5-amino-4,6-dichloro-2-ethyl-pyrimidine there was obtained 5-amino-4-chloro-2-ethyl - 6 - hydrazino-pyrimidine of melting point 134°–135° C.

(B) The process

In a manner analogous to that described in Example 1B, from 5 - amino-4-chloro-2-ethyl-6-hydrazino-pyrimidine and triethyl orthoformate there was obtained 5-amino-7-ethyl-pyrimido[5,4-e]-as-triazine; melting point 195°–196° C. (with decomposition); $\lambda_{max}$ (0.1-$\underline{N}$ hydrochloric acid) 217 nm. ($\epsilon$=10,700), 244 nm. ($\epsilon$=8,400), 347 nm. ($\epsilon$=8,000); nuclear magnetic resonance [$(CD_3)_2SO$]; $0.00\tau$ (1H, singlet), $7.11\tau$ (2H, quadruplet), $8.63\tau$ (3H, triplet).

EXAMPLE 4

(A) The preparation of the starting material

In a manner analogous to that described in Example 1A, from 5-amino-4,6-dichloro-2-methyl-pyrimidine there was obtained 5-amino-4-chloro-2-n-hexyl-6-hydrazino-pyrimidine.

(B) The process

In a manner analogous to that described in Example 1B, from 5-amino-4-chloro-2-n-hexyl-6-hydrazino-pyrimidine and triethyl orthoformate there was obtained 5-amino - 7 - n - hexyl-pyrimido[5,4-e]-as-triazine; melting point 171°–172° C. (with decomposition), $\lambda_{max}$ (0.1-$\underline{N}$ hydrochloric acid) 246 nm. ($\epsilon$=8,900), 347 nm. ($\epsilon$=7,900); nuclear magnetic resonance [$(CD_3)_2SO$]: $0.06\tau$ (1H, singlet), $7.2\tau$ (multiplet), $8–9.4\tau$ (11H, multiplet).

EXAMPLE 5

A mixture of 30 g. of 5-amino-7-methyl-pyrimido[5,4-e]-as-triazine (prepared as described in Example 1B), 18 g. of methylamine hydrochloride, 60 ml. of a 25–30% (wt./vol.) solution of methylamine in water and 600 ml. of methanol was stirred and boiled under reflux for 5 hours, a second equal portion of methylamine solution being added after 3 hours. After standing overnight, the resulting mixture was evaporated to dryness and the residue was treated with 600 ml. of water, cooled in ice and filtered. The resulting solid was washed with water and dried to yield 30 g. of 7-methyl-5-methylamino-pyrimido[5,a-e]-as-triazine of melting point 271° C. (with decomposition). Recrystallization from n-butanol did not significantly change the melting point; $\lambda_{max}$ (0.1-$\underline{N}$ hydrochloric acid) 223 nm. ($\epsilon$=12,000), 253 nm. ($\epsilon$=5,300), 360 nm. ($\epsilon$=9,900); nuclear magnetic resonance (trifluoracetic acid): $-0.3\tau$ (1H, singlet), $+0.1\tau$ (1H, broad), $6.35\tau$ (3H, singlet), $7.0\tau$ (3H, singlet).

EXAMPLE 6

32.0 g. of 5-chloro-1,2-dihydro-7-methyl-pyrimido[5,4-e]-as-triazine hydrochloride (prepared as described in the first paragraph of Example 1B) were suspended in 1 litre of ethanol and treated with 100 ml. of a 33% (wt./wt.) solution of dimethylamine in ethanol. The mixture was stirred at room temperature for 20 hours. After cooling to 0° C., the crystalline solid was collected and recrystalized from ca 230 ml. of ethanol to give 15.0 g. of 5-dimethylamino-7-methyl-pyrimido[5,4-e]-as-triazine of melting point 190°–191° C.

The mother liquors from the treatment were combined with the mother liquors from the crystallization and evaporated in vacuo. The residue was extracted with 500 ml.

of benzene, the benzene extract was evaporated *in vacuo* and the residue was recrystallized from *ca* 50 ml. of ethanol to yield a further 3.35 g. of 5-dimethylamino-7-methyl-pyrimido[5,4-e] - *as* - triazine of melting point 190°–191° C.

EXAMPLE 7

0.38 g. of 5-dimethylamino-7-methyl-pyrimido[5,4-e]-*as*-triazine (prepared as described in Example 6) were suspended in 8 ml. of methanol and 0.2 g. of methylamine hydrochloride and 2 ml. of a 33% (wt./wt.) solution of methylamine in ethanol were added to the suspension obtained. The mixture was heated under reflux for 2 hours and a further 2 ml. of a 33% (wt./wt.) solution of methylamine in ethanol were added. The heating was continued for a further 2 hours. The mixture was cooled to 0° C., the solid which separated was collected and recrystallized from *ca* 15 ml. of *n*-butanol to give 0.28 g. of 5 - methylamino-7-methyl-pyrimido[5,4-e]-*as*-triazine of melting point 271° C. (with decomposition).

EXAMPLE 8

1.1 g. of 5-chloro-1,2-dihydro - 7 - methyl - pyrimido [5,4-e]-*as*-triazine (prepared according to the procedure described in the second paragraph of Example 1B) were suspended in 25 ml. of ethanol and treated with 3 ml. of a solution of 33% (wt./wt.) methylamine in ethanol. The mixture was stirred at room temperature for 20 hours. The mixture was then cooled to 0° C., the resulting solid was collected and recrystallized from *ca* 40 ml. of *n*-butanol to yield 0.45 g. of 5-methylamino - 7 - methyl-pyrimido[5,4-e]-*as*-triazine of melting point 271° C. (with decomposition).

EXAMPLE 9

A mixture of 14.9 g. of 5-amino-4-chloro-6-hydrazino-2-methyl-pyrimidine (prepared as described in Example 1A) 27.0 g. of trimethyl orthobenzoate and 180 ml. of dry ethanol was stirred until the bulk of the solid had dissolved. The mixture was cooled to *ca* 15° C. in ice-water and 36.7 ml. of 5-$\underline{N}$ ethanolic hydrogen chloride were added. The red solution was stirred for 2 hours, the cooling bath was removed after 15 minutes and 150 ml. of dry ether were added after 1 hour. The red solid which formed was filtered off, washed twice with ether and dried in air to yield 25.4 g. of 5-chloro-1,2-dihydro-7-methyl - 3 - phenyl-pyrimido[5,4-e]-*as*-triazine hydrochloride.

The foregoing hydrochloride was suspended in 300 ml. of water and the mixture stirred at room temperature for 1 hour. The resulting bright orange solid was filtered off, washed free from acid with several portions of water and dried in a desiccator. 17.66 g. of 5-chloro-1,2-dihydro-7-methyl - 3 - phenyl - pyrimido[5,3-e]-*as*-triazine were obtained.

A mixture of 17.6 g. of 5-chloro-1,2-dihydro-7-methyl-3-phenyl-pyrimido[5,4-e]-*as*-triazine, 36.6 g. of a 33% (wt./wt.) solution of dimethylamine in ethanol and 300 ml. of dry ethanol was stirred at room temperature overnight. The mixture was then evaporated to dryness, the residual orange solid was suspended in 100 ml. of ether, filtered off, washed twice with ether and dried to give 16.4 g. of crude 5-dimethylamino-7-methyl - 3 - phenyl-pyrimido[5,4-e]-*as*-triazine of melting point 214°–215° C.

8.0 g. of the foregoing crude product were recrystallized from 120 ml. of boiling methyl Cellosolve to give 6.6 g. of pure 5 - dimethylamino - 7 - methyl-3-phenyl-pyrimido[5,4-e]-*as*-triazine of melting point 226°–227° C. Further recrystallization from 150 ml. of boiling *n*-butanol with the addition of alumina yielded 6.2 g. of the same product of melting point 226°–227° C.

EXAMPLE 10

A mixture of 8.2 g. of 5-dimethylamino-7-methyl-3-phenylpyrimido[5,4-e]-*as*-triazine (prepared as described in Example 9), 4.1 g. of methylamine hydrochloride, 28 g. of a 33% (wt./wt.) solution of methylamine in ethanol and 300 ml. of dry methanol was stirred and heated under reflux overnight. The mixture was evaporated to dryness and the yellow solid remaining behind was suspended in 100 ml. of water, filtered off and washed twice with water. 7.4 g. of product of melting point 215°–217° C. were obtained. This product was dried in a desiccator and recrystallized from 200 ml. of boiling methanol to yield 5.56 g. of pure 7-methyl-5-methylamino - 3 - phenyl-pyrimido [5,4-e]-*as*-triazine of melting point 224°–225° C.

EXAMPLE 11

A mixture of 54.3 g. of 5-chloro-1,2-dihydro-7-methyl-3 - phenyl - pyrimido[5,4-e]-*as*-triazine, prepared as described in the first two paragraphs of Example 9, 21.4 g. of sodium azide, 600 ml. of ethanol and 600 ml. of water was stirred and heated under reflux for 4 hours, the initial orange solid being replaced by a brown solid during this time. The mixture was cooled in ice for 1 hour, the brown solid was filtered off and washed twice with water and dried in a desiccator. 39.5 g. of product of melting point 267°–269° C. (with decomposition) were obtained. This product was recrystallized twice from 700 ml. of hot (105° C.) dimethylformamide to yield 30.4 g. of pure 5-amino-7-methyl - 3 - phenyl-pyrimido[5.4-e]-*as*-triazine of melting point 269° C. (with decomposition).

EXAMPLE 12

In a manner analogous to that described in the first two paragraphs of Example 9, 5-amino-4-chloro-2-ethyl-6-hydrazino-pyrimidine (prepared in accordance with Example 3A) was converted into 5-chloro-1,2-dihydro-7-ethyl-3 - phenyl - pyrimido[5,4-e]-*as*-triazine of melting point 172°–173° C.

In a manner analogous to that described in Example 11, 5-chloro-1,2-dihydro-7-ethyl-3-phenyl - pyrimido[5,4 - e]-*as*-triazine was converted into 5-amino-7-ethyl-3-phenyl-pyrimido[5,4-e]-*as*-triazine of melting point 239°–240° C.

EXAMPLE 13

(A) The preparation of the starting material

A mixture of 38.7 g. of 5-amino-4,6-dichloro-2-phenyl-pyrimidine and 315 ml. of hydrazine hydrate was stirred and heated to 70° C. An exothermic reaction occurred. After the spontaneous increase in temperature had ceased, the mixture was stirred at 90° C. for 10 minutes and the brown solution which formed was cooled in ice. The resulting buff solid was filtered off, washed twice with water and dried in a desiccator to yield 38.5 g. of product of melting point 173°–174° C. Recrystallization from 1200 ml. of boiling toluene with the addition of 15 g. of silica gel yielded 28.6 g. of 5-amino-4-chloro-6 - hydrazino - 2-phenyl-pyrimidine of melting point 178°–179° C. (with effervescence).

(B) The process

A mixture of 81.6 g. of 5-amino-4-chloro-6-hydrazino-2-phenyl-pyrimidine, 90 g. of triethyl orthoformate and 1500 ml. of dry ethanol was stirred and cooled in ice-water while 180 ml. of 4.5-$\underline{N}$ ethanolic hydrogen chloride were added over a period of about 5 minutes. The mixture was then stirred at room temperature for a further 1.5 hours. The red-orange solid which resulted was filtered off, washed twice with ether and dried in a desiccator to yield 78.3 g. of 5-chloro-1,2-dihydro-7-phenyl-pyrimido-[5,4-e]-*as*-triazine hydrochloride.

The foregoing hydrochloride was stirred with 1000 ml. of water for 40 minutes and the orange free base was filtered off and washed with water until the filtrates were free of acid. The solid was dried in a desiccator and yielded 58.0 g. of 5-chloro - 1,2 - dihydro - 7 - phenyl-pyrimido[5,4-e]-*as*-triazine of melting point 182°–184° C. (with decomposition).

A mixture of 29.4 g. of 5-chloro-1,2-dihydro-7-phenyl-pyrimido[5,4-e]-as-triazine, 96 ml. of a 33% (wt./wt.) solution of dimethylamine in ethanol and 250 ml. of dry ethanol was stirred at room temperature for 6 hours. The solid which precipitated from the solution during this time was filtered off, washed with ethanol and ether and dried to give 13.9 g. of crude 5-dimethylamino-7-phenyl-pyrimido[5,4-e]-as-triazine of melting point 238°–239° C. The filtrate was left to stand overnight at 0° C. and a second crop of solid was filtered off, washed twice with ethanol, twice with ether and dried in a desiccator, 10.5 g. of crude 5-dimethylamino-7-phenylpyrimido[5,4-e]-as-triazine of melting point 237°–239° C. being obtained.

The combined crude products were recrystallized from 1400 ml. of boiling n-butanol with the addition of charcoal to give 22.3 g. of pure 5-dimethylamino-7-phenyl-pyrimido[5,4-e]-as-triazine of melting point 243°–244° C. 8.0 g. of this product were again recrystallized from 500 ml. of boiling n-butanol to give 7.65 g. of pure product of melting point 243.5°–245° C.

EXAMPLE 14

A mixture of 13.6 g. of 5-dimethylamino - 7 - phenyl-pyrimido[5,4-e]-as-triazine (prepared as described in Example 13), 47.0 g. of a 33% (wt./wt.) solution of methylamine in ethanol, 7.8 g. of methylamine hydrochloride and 500 ml. of dry methanol was stirred and heated under reflux for 66 hours during which time a clear orange colored solution formed. The mixture was evaporated to dryness and the orange solid obtained was suspended in 200 ml. of water, filtered off and washed twice with water. After drying, 14.0 g. of crude 5-methylamino-7-phenyl-pyrimido[5,4-e]-as-triazine of melting point 203°–204° C. were obtained. After recrystallization from 350 ml. of boiling n-butanol, 11.1 g. of pure 5-methylamino-7-phenyl-pyrimido[5,4-e]-as-triazine of melting point 204°–206° C. were obtained.

EXAMPLE 15

A mixture of 29.4 g. of 5-chloro-1,2-dihydro-7-phenyl-pyrimido[5,4-e]-as-triazine (prepared as described in the first two paragraphs of Example 13B), 12.6 g. of sodium azide, 350 ml. of ethanol and 350 ml. of water was stirred and heated under reflux for 1 hour. The mixture was then cooled in ice for 2 hours and the brown solid was filtered off, washed twice with water and dried in a desiccator. 16.15 g. of crude 5-amino-7-phenyl-pyrimido[5,4-e]-as-triazine of melting point 278°–279° C. were obtained.

The foregoing crude product was recrystallized from 275 ml. of boiling methyl Cellosolve with the addition of charcoal to give 12.4 g. of pure 5 - amino - 7 - phenyl-pyrimido[5,4-e]-as-triazine of melting point 283°–284° C. A further recrystallization from the same solvent gave 10.2 g. of the same pure product with an unchanged melting point.

EXAMPLE 16

In a manner analogous to that described in the first two paragraphs of Example 13B, 5-amino - 4 - chloro - 6-hydrazino-2-phenyl-pyrimidine was converted by reaction with triethyl orthoacetate into 5-chloro-1,2-dihydro - 3 - methyl-7-phenyl-pyrimido[5,4-e]-as - triazine of melting point 184°–185° C.

In a manner analogous to that described in Example 15, 5-chloro-1,2-dihydro-3-methyl-7-phenyl-pyrimido[5,4-e]-as-triazine was converted into 5-amino - 3 - methyl-7-phenyl-pyrimido[5,4-e]-as-triazine of melting point 243°–244° C.

EXAMPLE 17

(A) The preparation of the starting material

A solution of 40 g. of 5-amino-4,6-dichloro-2-trifluoromethyl-pyrimidine and 20 ml. of hydrazine hydrate in 200 ml. of ethanol was stirred at room temperature for 1 hour. The mixture was evaporated to dryness in vacuo and the residue treated with 800 ml. of ethyl acetate. The solution was dried over sodium sulphate and then evaporated in vacuo to an oil which subsequently crystallized. Recrystallization from 350 ml. of benzene gave 34.8 g. of 5-amino-4-chloro-6-hydrazino-2-trifluoromethyl - pyrimidine of melting point 145°–147° C.

(B) The process

A solution of 34.8 g. of 5 - amino - 4 - chloro-6-hydrazino - 2 - trifluoromethyl - pyrimidine, 34.8 g. of triethyl orthoformate and 38 ml. of 5-$\underline{N}$ ethanolic hydrogen chloride in 600 ml. of dry ethanol was stirred at room temperature for 2 hours. The resulting red solution was evaporated to dryness in vacuo and the orange colored residue washed on to a filter with petrol (boiling range 40°–60° C.) and then dried. 42.0 g. of 5 - chloro - 1,2-dihydro - 7 - trifluoromethyl - pyrimido[5,4-e]-as-triazine hydrochloride of melting point 184° C. (with decomposition) was obtained.

A solution of 42.0 g. of 5 - chloro - 1,2 - dihydro-7-trifluoromethyl - pyrimido[5,4-e] - as - triazine hydrochloride and 87 ml. of a 33% (wt./wt.) solution of dimethylamine in ethanol in 1000 ml. of dry ethanol was stirred under nitrogen in the absence of light for 20 hours. Charcoal was then added and air was bubbled through the mixture for 1 hour. The mixture was then filtered, the filtrate evaporated to dryness in vacuo and the residue partitioned between 500 ml. of water and 500 ml. of benzene. The aqueous phase was separated and extracted four times with 300 ml. of benzene each time. The combined benzene solutions were dried over sodium sulphate and evaporated to dryness in vacuo. The crude product was purified by chromatography on silica gel. Recrystallization from carbon tetrachloride gave 15.9 g. of 5-dimethylamino-7-trifluoromethyl - pyrimido[5,4-e]-as-triazine of melting point 126°–127.5° C.

EXAMPLE 18

A solution of 5.5 g. of 5 - dimethylamino - 7 - trifluoromethyl-pyrimido[5,4-e]-as-triazine (prepared as described in Example 17), and 17 ml. of a 33% (wt./wt.) solution of methylamine in ethanol in 100 ml. of dry methanol was boiled under reflux for 1.5 hours and then evaporated to dryness in vacuo. The residue was recrystallized from 1100 ml. of carbon tetrachloride to yield 4.2 g. of 5-methylamino - 7 - trifluoromethyl-pyrimido[5,4-e]-as-triazine of melting point 180°–182° C.

EXAMPLE 19

A solution of 6.2 g. of 5 - dimethylamino - 7 - trifluoromethyl-pyrimido[5,4-e]-as-triazine (prepared as described in Example 17B) in 250 ml. of dry methanol was stirred and heated at 80° C. while anhydrous ammonia gas was bubbled through the solution for 2 hours. The mixture was left to stand at room temperature overnight and then evaporated to dryness in vacuo. The residue was recrystallized from toluene to give 3.8 g. of 5 - amino - 7 - trifluoromethyl-pyrimido[5,4-e]-as-triazine of melting point 157°–159.5° C.

EXAMPLE 20

A solution of 29 g. of 5 - amino - 7 - methyl-pyrimido-[5,4-e]-as-triazine (prepared as described in Example 1B), 41 g. of allylamine and 43 ml. of 5-$\underline{N}$ ethanolic hydrogen chloride in 490 ml. of dry methanol was stirred and heated at 70° C. for 24 hours, a further 10 g. of allylamine being added after 19 hours. The mixture was left to stand overnight at room temperature, evaporated to dryness in vacuo and the residue partitioned between 250 ml. of water and 500 ml. of chloroform. The aqueous phase was separated and extracted with 250 ml. of chloroform and then twice with 100 ml. of chloroform each time. The combined chloroform solutions were dried over sodium sulphate and evaporated in vacuo to give 36.0 g. of crude product. This was recrystallized from 800 ml. of water with the addition of charcoal and yielded 25.9 g.

of pure 5 - allylamino - 7 - methyl-pyrimido[5,4-e]-as-triazine of melting point 132°–133.5° C.

EXAMPLE 21

In a manner analogous to that described in Example 20, from 5 - amino - 7 - methyl-pyrimido[5,4-e]-as-triazine and propargylamine there was obtained 7-methyl-5-propargylamino - pyrimido[5,4-e]-as-triazine of melting point 185°–186° C.

EXAMPLE 22

In a mannner analogous to that described in Example 20, from 5 - amino - 7 - methyl-pyrimido[5,4-e]-as-triazine and cyclopropylamine there was obtained 5-cyclopropylamino - 7 - methyl-pyrimido[5,4-e]-as-triazine of melting point 151°–152° C.

EXAMPLE 23

In a manner analogous to that described in Example 20, from 5 - amino - 7 - methyl-pyrimido[5,4-e]-as-triazine and ethylamine there was obtained 5-ethylamino-7-methyl-pyrimido[5,4-e]-as-triazine of melting point 192.5°–194.5° C. (with decomposition).

EXAMPLE 24

In a manner analogous to that described in Example 20, from 5 - amino - 7 - methyl-pyrimido[5,4-e]-as-triazine and isopropylamine there was obtained 5-isopropylamino-7 - methyl - pyrimido[5,4-e]-as-triazine of melting point 119°–121° C.

EXAMPLE 25

In a manner analogous to that described in Example 20, from 5 - amino - 7 - methyl-pyrimido[5,4-e]-as-triazine and n-butylamine there was obtained 5-n-butylamino-7-methyl-pyrimido[5,4-e] - as - triazine of melting point 116.5°–118° C.

EXAMPLE 26

(A) The preparation of the starting material

In a manner analogous to that described in Example 1A from 5 - amino - 2 - benzyl-4,6-dichloro-pyrimidine there was obtained 5 - amino - 2 - benzyl-4-chloro-6-hydrazino-pyrimidine of melting point 132°–136° C. (with decomposition).

(B) The process

In a manner analogous to that described in the first paragraph of Example 17B, 5-amino-2-benzyl-4-chloro-6-hydrazino-pyrimidine was converted into 7-benzyl-5-chloro-1,2-dihydro-pyrimido[5,4-e]-as-triazine hydrochloride of indefinite melting point 175–185° C. (with decomposition).

11.4 g. of a 33% (wt./wt.) solution of dimethylamine in ethanol were added at room temperature to a suspension of 4.8 g. of 7-benzyl-5-chloro-1,2-dihydro-pyrimido-[5,4-e]-as-triazine hydrochloride in 100 ml. of ethanol. The mixture was then stirred at room temperature. A solution formed initially and then a crystalline solid precipitated. After stirring the mixture for 17 hours, the yellow crystals were collected and recrystallized from ethyl acetate. 1.77 g. of 7-benzyl-5-dimethylamino-pyrimido[5,4-e]-as-triazine of melting point 158°–160° C. were obtained.

EXAMPLE 27

72 ml. of 5-N ethanolic hydrogen chloride were added dropwise to a stirred mixture of 50 g. of 5-amino-4-chloro-6-hydrazino-2-methyl-pyrimidine and 64 g. of triethyl orthoformate in 250 ml. of dry ethanol, the reaction temperature being maintained below 30° C. by ice-cooling. The resulting pale orange suspension was stirred at room temperature for 2 hours, then the solid was filtered off and washed successively with acetone and ether to yield 62.1 g. of 5-chloro-1,2-dihydro-7-methyl-pyrimido[5,4-e]-as-triazine hydrochloride.

11 g. of 5-chloro-1,2-dihydro-7-methyl-pyrimido[5,4-e]-as-triazine hydrochloride were suspended in 300 ml. of absolute ethanol, the mixture was stirred and 22 g. of morpholine were added. The mixture was then stirred at room temperature for 15 hours. The precipitated solid was filtered off and the filtrate was evaporated in vacuo. The residue was extracted three times with 100 ml. of benzene each time, the benzene extracts were evaporated to dryness and the residue was combined with the solid initially collected. Recrystallization from 300 ml. of ethanol yielded 6.8 g. of 7-methyl-5-morpholino-pyrimido[5,4-e]-as-triazine of melting point 207°–209° C.

EXAMPLE 28

1 g. of 5-dimethylamino-7-methyl-pyrimido[5,4-e]-as-triazine (prepared as described in Example 6) was added to a solution of 1.9 g. of hydroxylamine in 40 ml. of methanol. The resulting solution was heated under reflux for 2 hours. The mixture was cooled and the resulting solid was collected. Recrystallization from 50 ml. of water gave 0.45 g. of 5-hydroxyamino-7-methyl-pyrimido[5,4-e]-as-triazine of melting point 265°–270° C. (with decomposition).

EXAMPLE 29

In a manner analogous to that described in the first paragraph of Example 27, 5-chloro-1,2-dihydro-7-ethyl-pyrimido[5,4-e]-as-triazine hydrochloride was prepared from 5-amino-4-chloro-2-ethyl-6-hydrazino-pyrimidine.

3.34 g. of 5-chloro-1,2-dihydro-7-ethyl-pyrimido[5,4-e]-as-triazine hydrochloride were taken up in 30 ml. of dry methanol and 3 ml. of ethanolamine were added. The mixture was stirred vigorously at room temperature for 22 hours. The mixture was filtered and the filtrate evaporated. A dark colored residue remained and this was dissolved in chloroform containing 5% (vol./vol.) methanol and chromatographed on alumina. A broad yellow band was eluted with chloroform containing 5% (vol./vol.) methanol. The eluate was evaporated to give 1.8 g. of a crystalline solid which, after recrystallization from ethyl acetate, yielded yellow crystals of 7-ethyl-5-(2-hydroxyethylamino)-pyrimido[5,4-e]-as-triazine of melting point 153°–154° C.

EXAMPLE 30

0.8 g. of 5-amino-7-methyl-pyrimido[5,4-e]-as-triazine (prepared as described in Example 1B) was taken up in 8 ml. of glacial acetic acid and 4 ml. of acetic anhydride and the mixture was heated at 100° C. for 15 minutes. On cooling the solution, 0.44 g. of crystals was deposited. These crystals were collected and washed with ethanol and ether and, after drying melted at 184°–185° C. (with decomposition). Two recrystallizations from anhydrous ethanol gave 0.28 g. of 5-acetamido-7-methyl-pyrimido-[5,4-e]-as-triazine in the form of red needles of melting point 185°–186° C. (with decomposition).

EXAMPLE 31

0.8 g. of 5-amino-7-methyl-pyrimido[5,4-e]-as-triazine was taken up in 10 ml. of propionic anhydride and the mixture heated at 80° C. for 30 minutes. On cooling, fine red crystals of melting point 154°–155° C. were deposited and were collected and washed with ether. After recrystallization from anhydrous ethanol, 0.57 g. of 7-methyl-5-porpionamido - pyrimido[5,4 - e] - as - triazine of melting point 156° was obtained.

EXAMPLE 32

8.0 g. of 5-amino-7-methyl-pyrimido[5,4-e]-as-triazine were taken up in 12 ml. of isobutyric anhydride, 11 ml. of triethylamine and 180 ml. of chloroform and the mixture was stirred and heated under reflux for 5 hours. The solution was cooled, a small amount of solid was filtered off and the filtrate was evaporated *in vacuo*. The residual red solid was recrystallized from anhydrous ethanol to give 4.6 g. of 5-*iso*butyramido-7-methyl-pyrimido[5,4-e]-*as*-triazine in the form of orange-red needles of melting point 157.5°–159° C.

EXAMPLE 33

4.0 g. of 5-amino-7-methyl-pyrimido[5,4-e]-*as*-triazine were taken up in 45 ml. of absolute pyridine and, with vigorous stirring, 4.5 ml. of *p*-chloro-benzoyl chloride were added dropwise over a period of 1 minute. The mixture was stirred for 10 minutes and 150 ml. of water were added to the resulting solution. A solid precipitated and this was collected and washed with water and acetone. The solid was then dissolved in chloroform containing 10% (vol./vol.) methanol and, after filtering the solution, petrol of boiling range 60°–80° C. was added. 2.75 g. of a red crystalline deposit, 5-(*p*-chloro-benzamido)-7-methyl-pyrimido[5,4-e]-*as*-triazine of melting point 203° C. (with decomposition) were obtained.

EXAMPLE 34

In a manner analogous to that described in Example 6, from 5-chloro - 1,2 - dihydro-7-methyl-pyrimido[5,4-e]-*as*-triazine and diethylamine there was obtained 5-diethylamino-7-*neo*pentyl-pyrimido[5,4-e]-*as*-triazine of melting point 123° C.

EXAMPLE 35

11 g. of 5-chloro-1,2-dihydro-7-methyl-pyrimido[5,4-e]-*as*-triazine hydrochloride were suspended in 300 ml. of ethanol. The mixture was stirred and 22 g. of morpholine were added. The resulting mixture was then stirred at room temperature for 15 hours. The solid was removed by filtration and the filtrate was evaporated *in vacuo*. The residue was extracted three times with 100 ml. of benzene each time, the combined benzene extracts were evaporated and the residue was bulked with the solid collected earlier. Recrystallization from 300 ml. of ethanol yielded 6.8 g. of 7 - methyl-5-morpholino-pyrimido[5,4-e]-*as*-triazine of melting point 207°–209° C.

EXAMPLE 36

In a manner analogous to that described in Example 6, 5 - chloro - 1,2-dihydro-7-*neo*pentyl-pyrimido[5,4-e]-*as*-triazine hydrochloride was converted into 5-dimethylamino-7-*neo*pentyl-pyrimido[5,4-e]-*as*-triazine of melting point 187°–188.5° C.

EXAMPLE 37

In a manner analogous to that described in Example 7, 5 - dimethylamino-7-*neo*pentyl-pyrimido[5,4-e]-*as*-triazine was converted into 5-methylamino-7-*neo*pentyl-pyrimido[5,4-e]-*as*-triazine of melting point 162°–163° C.

EXAMPLE 38

25.0 g. of 7-methyl-5-methylamino-pyrimido[5,4-e]-*as*-triazine are mixed with 150 g. of lactose and 30 g. of starch and the mixture is passed through a comminuting machine. The mixture is then returned to the mixer and 5 mg. of talc are added, whereupon the entire mixture is blended thoroughly and finally filled into opaque hard-shell gelatin capsules. Each capsule contains 210 mg. of ingredients with an active ingredient content of 25 mg.

EXAMPLE 39

Capsules are prepared in the manner described in Example 38 using 5-dimethylamino-7-methyl-pyrimido[5,4-e]-*as*-triazine or 5-methylamino-7-phenyl-pyrimido[5,4-e]-*as*-triazine in place of 7-methyl-5-methylamino-pyrimido[5,4-e]-*as*-triazine.

We claim:
1. A compound of the formula

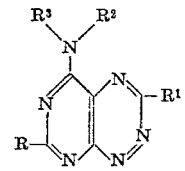

wherein R is a trifluoromethyl, lower alkyl, aryl or lower aralkyl group, $R^1$ is a hydrogen atom or a lower alkyl, aryl or lower aralkyl group, $R^2$ is a hydrogen atom and $R^3$ is a hydrogen atom or a lower alkyl, lower alkenyl, lower alkynyl, lower cycloalkyl, aryl, lower aralkyl, hydroxy, hydroxy-(lower alkyl) or acyl group or $R^2$ and $R^3$ each represent a lower alkyl group which may be joined directly or through one additional hetero atom selected from the group consisting of an oxygen, nitrogen or sulfur atom to form with the nitrogen atom to which they are attached a staurated 5-membered or 6-membered heteromonocyclic ring wherein aryl and ara- are phenyl or phenyl mono- or disubstituted with a member of the group consisting of halo, $C_{1-6}$ lower alkyl and $C_{1-6}$ lower alkoxy, and acyl is selected from the group consisting of $C_{1-6}$ lower alkane carboxylic acid, benzoic acid, or halo-benzoic acid.

2. The compound of claim 1 wherein R is lower alkyl; $R^1$ is hydrogen or lower alkyl; $R^7$ is hydrogen and $R^3$ is hydrogen or lower alkyl.

3. The compound of claim 2 which is 5-amino-7-methyl-pyrimido[5,4-e]-*as*-triazine.

4. The compound of claim 2 which is 5-amino-3,7-dimethyl-pyrimido[5,4-e]-*as*-triazine.

5. The compound of claim 2 which is 5-amino-7-ethyl-pyrimido[5,4-e]-*as*-triazine.

6. The compound of claim 2 which is 5-amino-7-*n*-hexyl-pyrimido[5,4-e]-*as*-triazine.

7. The compound of claim 2 which is 7-methyl-5-methylamino-pyrimido[5,4-e]-*as*-triazine.

8. The compound of claim 2 which is 5-ethylamino-7-methyl-pyrimido[5,4-e]-*as*-triazine.

9. The compound of claim 2 which is 5-*iso*propylamino-7-methyl-pyrimido[5,4-e]-*as*-triazine.

10. The compound of claim 2 which is 5-*n*-butylamino-7-methyl-pyrimido[5,4-e]-*as*-triazine.

11. The compound of claim 2 which is 5-methylamino-7-*neo*pentyl-pyrimido[5,4-e]-*as*-triazine.

12. The compound of claim 1 wherein R is lower alkyl; $R^1$ is hydrogen or lower alkyl; and $R^2$ and $R^3$ each are lower alkyl.

13. The compound of claim 12 which is 5-dimethylamino-7-methyl-pyrimido[5,4-e]-*as*-triazine.

14. The compound of claim 12 which is 5-diethylamino-7-methyl-pyrimido[5,4-e]-*as*-triazine.

15. The compound of claim 12 which is 5-dimethylamino-7-neopentyl-pyrimido[5,4-e]-*as*-triazine.

16. The compound of claim 1 which is 7-methyl-5-morpholinopyrimido[5,4-e]-*as*-triazine.

17. The compound of claim 1 which is 5-dimethylamino-7-methyl-3-phenyl-pyrimido[5,4-e]-*as*-triazine.

18. The compound of claim 1 which is 7-methyl-5-methylamino-3-phenyl-pyrimido[5,4-e]-*as*-triazine.

19. The compound of claim 1 which is 5-amino-7-methyl-3-phenyl-pyrimido[5,4-e]-*as*-triazine.

20. The compound of claim 1 which is 5 - amino - 7-ethyl - 3 - phenylpyrimido[5,4-e]-*as*-triazine.

21. The compound of claim 1 which is 5-dimethylamino-7-phenyl-pyrimido[5,4-e]-*as*-triazine.

22. The compound of claim 1 which is 5-methylamino-7-phenyl-pyrimido[5,4-e]-*as*-triazine.

23. The compound of claim 1 which is 5-amino-7-phenyl-pyrimido[5,4-e]-*as*-triazine.

24. The compound of claim 1 which is 5-amino-3-methyl-7-phenyl-pyrimido[5,4-e]-*as*-triazine.

25. The compound of claim 1 which is 5-dimethylamino - 7 - trifluoromethyl-pyrimido[5,4-e]-as-triazine.

26. The compound of claim 1 which is 5-methylamino-7-trifluoromethyl-pyrimido[5,4-e]-as-triazine.

27. The compound of claim 1 which is 5-amino-7-trifluoromethyl-pyrimido[5,4-e]-as-triazine.

28. The compound of claim 1 which is 5-allylamino-7-methyl-pyrimido[5,4-e]-as-triazine.

29. The compound of claim 1 which is 7-methyl-5-propargylamino-pyrimido[5,4-e]-as-triazine.

30. The compound of claim 1 which is 5-cyclopropylamino-7-methyl-pyrimido[5,4-e]-as-triazine.

31. The compound of claim 1 which is 7-methyl-5-morpholino-pyrimido[5,4-e]-as-triazine.

32. The compound of claim 1 which is 5-hydroxyamino 7-methyl-pyrimido[5,4-e]-as-triazine.

33. The compound of claim 1 which is 7-ethyl-5-(2-hydroxyethylamino)-pyrimido[5,4-e]-as-triazine.

34. The compound of claim 1 which is 5-acetamido-7-methyl-pyrimido[5,4-e]-as-triazine.

35. The compound of claim 1 which is 7-methyl-5-propionamido-pyrimido[5,4-e]-as-triazine.

36. The compound of claim 1 which is 5-isobutyramido-7-methyl-pyrimido[5,4-e]-as-triazine.

37. The compound of claim 1 which is 7-methyl-5-(p-chlorobenzamido)-pyrimido[5,4-e]-as-triazine.

38. The compound of claim 1 which is 7-benzyl-5-dimethylamino-pyrimido[5,4-e]-as-triazine.

39. A compound of the formula

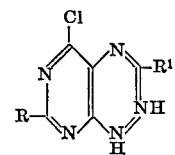

IV wherein R is a trifluoromethyl, lower alkyl, aryl or lower aralkyl group, and $R^1$ is a hydrogen atom or a lower alkyl, aryl or lower aralkyl group wherein aryl and ara- are phenyl or phenyl mono- or di-substituted with a member of the group consisting of halo, $C_{1-6}$ lower alkyl and $C_{1-6}$ lower alkoxy.

40. The compound of claim 39 wherein R is lower alkyl and $R^1$ is hydrogen.

41. The compound of claim 39 wherein R is aryl and $R^1$ is hydrogen.

References Cited

UNITED STATES PATENTS 3,213,090  10/1965  Roch _____ 260—249.5 X

JOHN M. FORD, Primary Examiner

U.S. Cl. X.R.

424—249; 260—326.85, 268 BC, 293.59, 247.5 B, 243 B

UNITED STATES PATENT AND TRADEMARK OFFICE
CERTIFICATE OF CORRECTION

PATENT NO. : 3,813,393
DATED : May 28, 1974
INVENTOR(S) : Kenneth John Maynard Andrews and Brian Peter Tong It is certified that error appears in the above-identified patent and that said Letters Patent are hereby corrected as shown below:

Col. 1 after Ser. No. 265,879, insert

Foreign Application Priority Data

| No. 32801 | July 13, 1971 | Great Britain |
| No. 37049 | August 6, 1971 | Great Britain |
| No. 13116 | March 21, 1972 | Great Britain |

Col. 18, line 5, 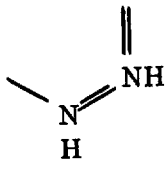 should be 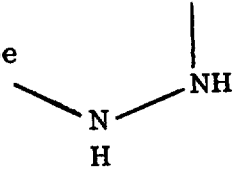

Signed and Sealed this

Third Day of August 1976

[SEAL]

Attest:

RUTH C. MASON
Attesting Officer

C. MARSHALL DANN
Commissioner of Patents and Trademarks